United States Patent
Zhou

(10) Patent No.: US 7,408,903 B2
(45) Date of Patent: Aug. 5, 2008

(54) METHOD FOR SELECTING SYNCHRONOUS CODES IN A MOBILE COMMUNICATION SYNCHRONIC SYSTEM

(75) Inventor: Lei Zhou, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 924 days.

(21) Appl. No.: 10/480,206

(22) PCT Filed: Mar. 27, 2002

(86) PCT No.: PCT/CN02/00203

§ 371 (c)(1),
(2), (4) Date: Dec. 10, 2003

(87) PCT Pub. No.: WO02/002096

PCT Pub. Date: Dec. 19, 2002

(65) Prior Publication Data

US 2004/0176121 A1    Sep. 9, 2004

(30) Foreign Application Priority Data

Jun. 11, 2001  (CN) ............................. 01 1 18758

(51) Int. Cl.
*H04B 7/216* (2006.01)

(52) U.S. Cl. ................ 370/335; 370/342; 370/350; 455/502

(58) Field of Classification Search ........... 370/329, 370/335, 342, 350; 455/502
See application file for complete search history.

(56) References Cited

U.S. PATENT DOCUMENTS

| | | | | |
|---|---|---|---|---|
| 6,078,607 | A * | 6/2000 | Monroe et al. | 375/145 |
| 6,567,482 | B1 * | 5/2003 | Popovic' | 375/343 |
| 6,714,526 | B2 * | 3/2004 | Wei et al. | 370/335 |
| 6,888,880 | B2 * | 5/2005 | Lee et al. | 375/149 |

(Continued)

FOREIGN PATENT DOCUMENTS

CN    1264964    8/2000

(Continued)

OTHER PUBLICATIONS

CWTS; "CWTS STD_Tdd-104 V3.3.0 (Sep. 2000); China Wireless Telecommunication Standard (CWTS); Working Group 1 (WG!); Spreading and Modulation" [Online]; Sep. 2000; XP002399340; Retrieved from the Internet: URL:http://www.ccsa.org.cn/ITU_spec/ITU-R/M.1457/M.1457-2/TDD/V3/TDD-104.doc; [retrieved on Sep. 18, 2006]; pp. 9-10, Sections 5.1 and 5.2.

(Continued)

*Primary Examiner*—Min Jung

(57) ABSTRACT

The invention discloses a selecting method of synchronization codes for a mobile communication synchronization system. The method selects binary codes with zero correlation window as the synchronization codes for a mobile communication synchronization system, i.e. selects binary codes whose periodic autocorrelation and periodic cross-correlation have the zero correlation window, or whose aperiodic autocorrelation and aperiodic cross-correlation have the zero correlation window; and for former transmitting the synchronization codes uses cyclic and continuous mode and for later a guard period is added to each synchronization code for transmitting. A width of the zero correlation window is determined to be greater than time delay spread of a multipath signal. Using the method, the selected synchronization codes can implement more accurate synchronization.

7 Claims, 1 Drawing Sheet

U.S. PATENT DOCUMENTS

| | | | |
|---|---|---|---|
| 6,963,600 B1 | 11/2005 | Fan et al. | |
| 7,248,621 B2 * | 7/2007 | Rudolf | 375/145 |
| 2002/0057727 A1 * | 5/2002 | Li | 375/146 |
| 2002/0136171 A1 * | 9/2002 | Mennekens et al. | 370/280 |
| 2003/0076874 A1 * | 4/2003 | Li et al. | 375/145 |
| 2003/0087603 A1 * | 5/2003 | Li et al. | 455/63 |
| 2004/0008758 A1 * | 1/2004 | Ando | 375/150 |

FOREIGN PATENT DOCUMENTS

| | | |
|---|---|---|
| JP | 11340950 | 12/1999 |
| WO | WO0045530 | 8/2000 |

OTHER PUBLICATIONS

Deng Xinmin et al.; "Spreading sequence sets with zero correlation zone"; Electronics Letters, IEE Stevenage; GB; vol. 36, No. 11; May 25, 2000; pp. 993-994; XP006015278; ISSN: 0013-5194.

* cited by examiner

METHOD FOR SELECTING SYNCHRONOUS CODES IN A MOBILE COMMUNICATION SYNCHRONIC SYSTEM

FIELD OF THE TECHNOLOGY

The invention generally relates to wireless telecommunication technology, specifically to a synchronization scheme with specifically selected synchronization codes of the synchronization system in the mobile communication technology.

BACKGROUND OF THE INVENTION

Synchronization is a key technique in a mobile communication system. Searching with a synchronization code, the maximum correlation peak can be found through a correlation method; then the synchronization of subscriber signal is implemented or the most appropriate base station for the subscriber access is found. At present in a mobile communication system, the selected synchronization codes are pseudo-random codes. As the autocorrelation and cross-correlation value of these pseudo-random codes at the neighborhood where time-delay equals to zero are not equal to zero, so there is mutual interference between these pseudo-random codes.

Code division multiple access (CDMA) is an interference limited technology. When system synchronization is made with synchronization codes, the synchronization accuracy and veracity will be affected by interference, which includes interference caused by the multipath propagation of the synchronization signal itself and interference caused by the synchronization signals of other subscribers, etc.

For suppressing these interferences, a multi-user detection technique or other adaptive process methods are used at present, but they have high computation complexity and are difficult to realize. Therefore, with the present synchronization codes and without increasing the system complexity, it is difficult to implement a low interference, high accuracy and veracity of synchronization.

SUMMARY OF THE INVENTION

Objective of the invention is to design a synchronization scheme with a selecting method of the synchronization codes for a mobile communication system, and the synchronization codes selected by this method will increase synchronization accuracy without increasing the system complexity.

For describing the technical scheme of this method, first the following definitions will be introduced.

Definition 1:

Suppose a and b are two binary codes with equal length N, $a=[a_0 a_1 \ldots a_{N-1}]$ and $b=[b_0 b_1 \ldots b_{N-1}]$; wherein $a_i, b_i \in \{-1, 1\}$, $i=0,1,\ldots N-1$;

then $$r_a(\tau) = \frac{1}{N} \sum_{t=0}^{N-1} a_t a_{(t+\tau) \% N} \quad (1)$$

$$r_a^{(l)}(\tau) = \frac{1}{N} \sum_{t=0}^{N-1-\tau} a_t a_{t+\tau} \quad (2)$$

wherein $\tau=0,1 \ldots N-1$; and formulas (1) and (2) are periodic autocorrelation and aperiodic autocorrelation of the code a, respectively.

$$r_{ab}(\tau) = \frac{1}{N} \sum_{t=0}^{N-1} a_t b_{(t+\tau) \% N} \quad (3)$$

$$r_{ab}^{(l)}(\tau) = \frac{1}{N} \sum_{t=0}^{N-1-\tau} a_t b_{t+\tau} \quad (4)$$

wherein $\tau=0,1 \ldots N-1$; % is a modulo operator and formulas (3) and (4) are periodic cross-correlation and aperiodic cross-correlation of the codes a and b, respectively.

Definition 2:

Suppose spread spectrum codes $m_1, m_2 \ldots m_p$ with length N simultaneously satisfy:

a. periodic autocorrelation $r_{m_i}(\tau)=0$ or aperiodic autocorrelation $r_{m_i}^{(l)}(\tau) = 0, i = 1, 2, \ldots, P, \tau \in [-L, 0) \cup (0, L], L < N;$ b. periodic cross-correlation $r_{m_i m_j}(\tau)=0$ or aperiodic cross-correlation $r_{m_i m_j}^{(l)}(\tau) = 0, i, j = 1, 2, \ldots, P, i \neq j, \tau \in [-L, L], L < N,$ then binary codes with the zero correlation characteristics are called codes with zero correlation window.

Technical scheme to implement objective of the invention is as following:

A method of selecting synchronization codes for a mobile communication synchronization system, it is characterized that binary codes with zero correlation window characteristics are selected as the synchronization codes for a mobile communication synchronization system.

The binary codes with the zero correlation window characteristics are binary codes whose periodic autocorrelation and periodic cross-correlation have the zero correlation window characteristics, or whose aperiodic autocorrelation and aperiodic cross-correlation have the zero correlation window characteristics.

A width of the zero correlation window is determined to be larger than a time delay spread of a multipath signal.

For the synchronization codes whose periodic autocorrelation and periodic cross-correlation have the zero correlation window characteristics, the synchronization codes are transmitted by a cyclic and continuous transmitting mode.

The step of continuously transmitting the selected synchronization codes is that each selected synchronization code is repeatedly transmitted until a synchronization time slot with 96 chips is filled in.

For the synchronization codes whose aperiodic autocorrelation and aperiodic cross-correlation have the zero correlation window, a guard period is added to each synchronization code for transmitting.

The step of adding the guard period in the transmitted synchronization code is that, in the synchronization code including a 32 chips GP and a 64 chips SYNC time slot, the 64 chips SYNC time slot is substituted by a code whose aperiodic autocorrelation and aperiodic cross-correlation have the zero correlation window.

When making synchronization searching, the synchronization codes are captured according to a correlation method.

In the invention, the correlation window width of a selected synchronization code is determined according to a system requirement, which includes, but not limited, the followings: the multipath time delay spread of a wireless signal in the mobile communication cell, chip rate in the mobile communication system etc.

In practice, with the selected codes of the invention, the capture of the synchronization codes accords to the ordinary correlation method.

The effect of the invention is as follow. Since the selected synchronization code has a better autocorrelation characteristics, the multipath signals caused by multipath propagation of the synchronization code itself does not produce interference; at the same time, since the cross-correlation between different synchronization codes also has zero correlation window, synchronization codes of other subscribers does not bring interference to the subscriber too. Therefore, without using multiple user detection technique or other adaptive process methods, the synchronization codes selected by the method of the invention can have good correlation detection to implement a more accurate synchronization.

When periodic autocorrelation and periodic cross-correlation of the selected synchronization codes have the zero correlation window, the synchronization codes can be transmitted with a cyclic and continuous transmitting mode. When aperiodic autocorrelation and aperiodic cross-correlation of the selected synchronization codes have the zero correlation characteristics, the synchronization codes can be transmitted with adding a guard period mode. Both of these modes can guarantee implementation of the effect mentioned above.

EMBODIMENTS OF THE INVENTION

Figure 1:
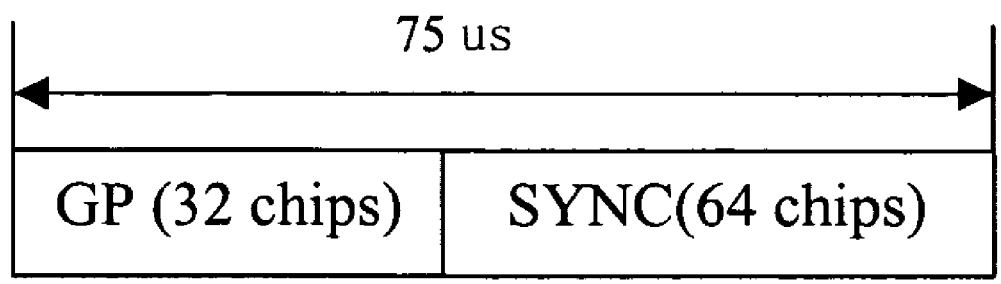
FIG. 1 shows a structure diagram of a synchronization code selected with the method of the invention.

The invention will be described in more detail with reference the FIGURE and embodiment.

Refer to FIG. 1, the length of a synchronization code is 75 µs, the protection time-slot GP is 32 chips and the synchronization time-slot (SYNC) is 64 chips. Since the synchronization code is an aperiodic autocorrelation and aperiodic cross-correlation synchronization code with zero correlation characteristics, so a protection time-slot is added.

In a time division-synchronous CDMA (TD-SCDMA) mobile communication system, according the requirement of "Spreading and modulation" in reference document TS C104, the SYNC part of FIG. 1 is substituted with a code that is a aperiodic autocorrelation and aperiodic cross-correlation synchronization code with a zero correlation window, so the mutual interference of the synchronization codes is reduced.

A binary code with periodic autocorrelation and periodic cross-correlation with a zero correlation window characteristics, which is proposed by document, "Spreading sequence sets with zero correlation zone", Deng Xinmin and Fan Pingzhi, Electronics Letters, 2000, 36(11): 993~994, can also be used as synchronization codes, it is shown as formula (5) in the following:

$$a_1 = (----+-+--+--+++-+--+++--) \quad (5)$$

$$a_2 = (--+---+++++-+++---+---+-+)$$

$$a_3 = (+-+---+---++-+-----++-++)$$

$$a_4 = (--+++--+-+++++-++-+-++++)$$

Wherein "−" represents "−1" and "+" represents "+1". When transmitting the synchronization code, a code such as $a_1$ is selected. Since there are 96 chips in FIG. 1 synchronization code structure, so synchronization code $a_1$ must be transmitted repeatedly four times, i.e. $a_1\ a_1\ a_1\ a_1$, to fill the synchronization time slot.

The code in formula (5) has a zero correlation window with three chips width, the periodic autocorrelation and periodic cross-correlation, which is computed by formulas (1) and (3), satisfy:

$$r_{a_i}(\tau)=0, i=1,2,3,4, \tau=1,2,3 \text{ and } r_{a_i a_j}(\tau)=0, i,j=1,2,3,4,$$
$$i \ne j, \tau=0,1,2,3$$

Suppose taking the arriving time of first path signal as reference for the received multipath signal of a base station, the maximum relative time delay of other paths is $T_{max}$ and system chip period is Tc; then when $T_{max}<3Tc$, the codes of the formula (5) can be used as the system synchronization codes, otherwise it is necessary to take a code with a wider zero correlation window as the system synchronization codes.

When energy of multipath signals is relatively small, such as less than −20 dB, then affection to the system is smaller too. In this case, the maximum relative time delay of each of path $T_{max}$ can take the maximum relative time delay of multipath with enough signal energy.

The invention claimed is:

1. A method for selecting synchronization codes for a mobile communication synchronization system, comprising: selecting binary codes having zero correlation window characteristics as synchronization codes for the mobile communication synchronization system, wherein the binary codes having the zero correlation window characteristics are binary codes whose periodic autocorrelation and periodic cross-correlation have the zero correlation window characteristics, or binary codes whose aperiodic autocorrelation and aperiodic cross-correlation have the zero correlation window characteristics.

2. The method according to claim 1, wherein a width of the zero correlation window characteristic is determined to be larger than a time delay spread of a multipath signal.

3. The method according to claim 1, further comprising, for the synchronization codes whose periodic autocorrelation and periodic cross-correlation have the zero correlation window characteristics, transmitting the synchronization codes by a cyclic and continuous transmitting mode.

4. The method according to claim 3, wherein transmitting the synchronization codes by the cyclic and continuous transmitting mode comprises, repeatedly transmitting each synchronization code until a synchronization time slot with 96 chips is filled in.

5. The method according to claim 1, further comprising, for the synchronization codes whose aperiodic autocorrelation and aperiodic cross-correlation have the zero correlation window characteristics, transmitting the synchronization codes by adding a guard period to each synchronization code.

6. The method according to claim 5, wherein the transmitting the synchronization codes by adding a guard period to each synchronization code comprising, for the synchronization code which includes a 32 chips guard period and a 64 chips sync time slot, substituting the 64 chips sync time slot by the synchronization code whose aperiodic autocorrelation and aperiodic cross-correlation have the zero correlation window.

7. The method according to claim 1, further comprising, capturing the synchronization codes according to a correlation method in a synchronization searching procedure.

* * * * *